No. 792,612. PATENTED JUNE 20, 1905.
H. C. PORTER.
BATTERY PLATE SEPARATOR.
APPLICATION FILED AUG. 19, 1904.
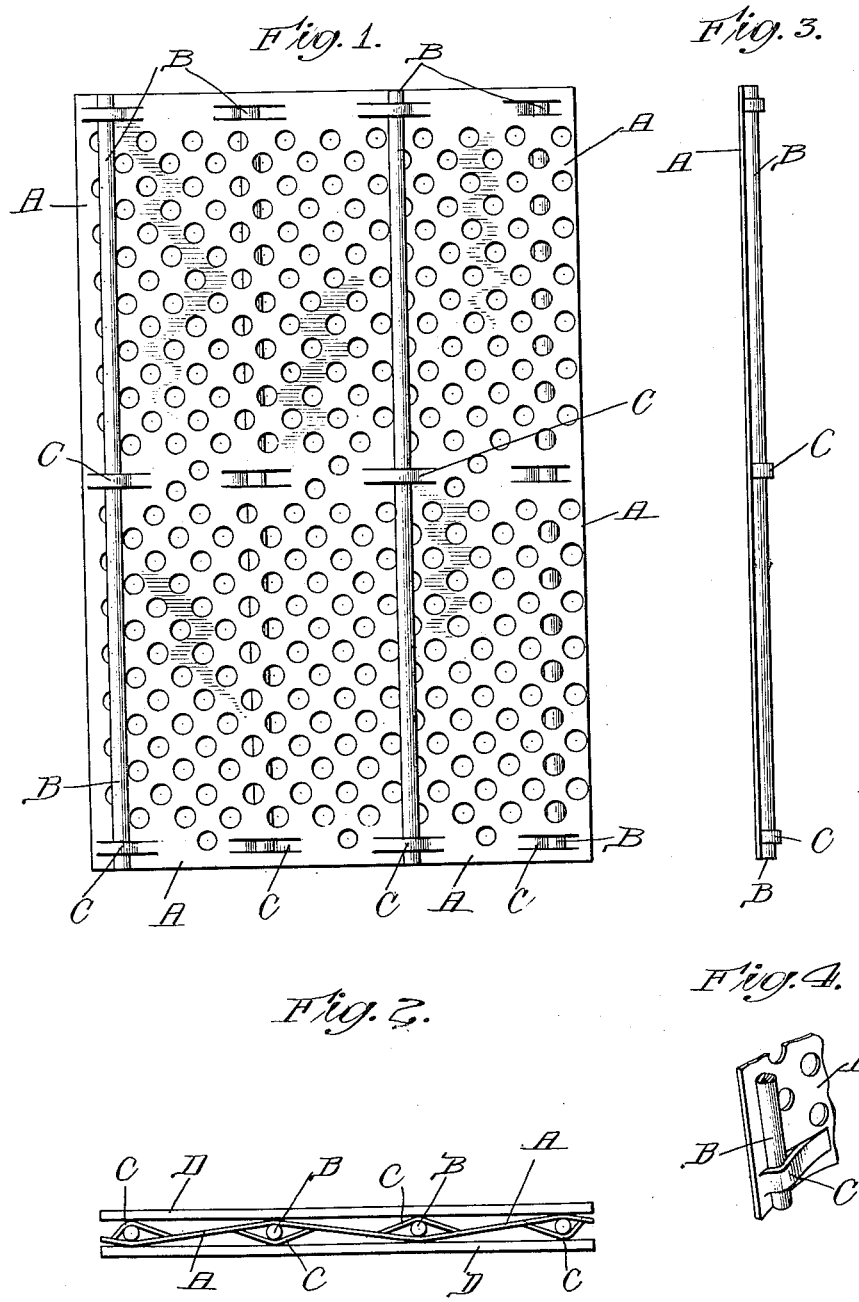

No. 792,612. Patented June 20, 1905.

UNITED STATES PATENT OFFICE.

HENRY C. PORTER, OF WAUKEGAN, ILLINOIS, ASSIGNOR TO EVANSVILLE BATTERY & ELECTRIC COMPANY, OF EVANSVILLE, INDIANA, A CORPORATION OF INDIANA.

BATTERY-PLATE SEPARATOR.

SPECIFICATION forming part of Letters Patent No. 792,612, dated June 20, 1905.

Application filed August 19, 1904. Serial No. 221,367.

*To all whom it may concern:*

Be it known that I, HENRY C. PORTER, a citizen of the United States, residing at Waukegan, in the county of Lake and State of Illinois, have invented certain new and useful Improvements in Battery-Plate Separators, of which the following is a specification.

This invention relates to battery-plate separators intended for use in secondary batteries, and has for its primary object the production of a cheap and durable separator that shall prevent short-circuiting of the battery-plates or of the active material placed thereon and shall also permit free circulation of the electrolytic fluid in the battery and at the same time serve to arrest the washing action thereof when the battery is used portably. It will also afford a permanent egress for the gases resulting from the action of the battery. These and such other objects as may hereinafter appear are attained by the devices illustrated in the accompanying drawings, in which—

Figure 1 represents a side elevation of a separator embodying my invention. Fig. 2 represents a plan view thereof, showing battery-plates on opposite sides of the separator. Fig. 3 is an end view of the separator, and Fig. 4 is a detail showing one corner of the separator in perspective.

Like letters of reference refer to the same parts in the several figures of the drawings.

Referring by letter to the accompanying drawings, A indicates a perforated plate of hard rubber, celluloid, or other insulating material of any suitable shape or dimension, and B vertical rods of hard rubber, celluloid, or other material removably secured to the plate A, preferably near the side edges thereof and at two or more points intermediate thereto. I provide the plate A with a series of loops C, integral therewith, formed by two horizontal parallel cuttings in the plate. The plate is then bent and the cut portion bent oppositely thereto outwardly, forming loops for the insertion of the rods B. If desired, the sheets either before or after the plates are cut may be placed in a suitable mold, subjected to a proper degree of heat, and formed into a series of reversed curves or made to assume a corrugated form, the highest points of elevation and the lowest points of depression being in the vertical lines connecting the centers of the cut portions.

It will be understood that the rods B are located at opposite sides of the plate A in staggered relation to each other, so that when the separator is placed between a pair of plates in a storage battery, as shown in Fig. 2, the battery-plates will not only be separated from each other, but also separated from the plate A.

The configuration of the rods and plates is of course immaterial; but as it is desirable to reduce the contacting surfaces thereof with the battery-plates to the minimum I prefer to use circular rods, as illustrated in the drawings, as these rods are very cheap to produce and also present a minimum contacting surface with the battery-plates.

The sheet A is preferably manufactured of thin celluloid or hard rubber, and by its use in connection with the rods I am enabled to provide a thoroughly efficient separator at a much less cost than any now on the market.

In order to provide a free circulation of the electrolytic fluid, the plate A must be perforated; but the portion unperforated may interpose sufficient obstruction to prevent the washing of the fluid back and forth against the plates when the battery is portably mounted.

The rods B serve to strengthen and stiffen the plates A and also cover a minimum surface on the battery-plates, thus exposing the maximum quantity of the usual active material to the electrolytic fluid, while materially assisting in holding the active material on the battery-plates themselves and at the same time keeping the battery-plates D properly separated from each other, forming vertical channels between the plates through which the gases resulting from the action of the battery are free to escape. This last-mentioned advantage is of well-recognized importance in storage batteries, as the gases if not permitted free escape from the electrolytic fluid will form bubbles on the surface of the plate, create internal resistance, lessen the surface of active material exposed, and correspondingly reduce the efficiency of the battery and discharge therefrom. It is therefore especially desirable in the use of separators that while the plates shall be held separate from one another and the active material shall be held upon the battery-plate the fluid should have free circulation in the battery, but be restrained from such a washing action as would tend to dislodge the active material from the plates.

Economy in the construction of these separators is of great importance, for the reason that a large number of separators is needed in the construction of storage batteries. It will be readily seen that a battery using a separator that is efficient and that can be manufactured for a considerably less cost than any now on the market will be of commercial advantage in competition with batteries of the same kind and class.

I claim—

1. A separator for battery-plates comprising a self-supporting flexible sheet of insulating material and a plurality of bars arranged vertically and in staggered relation upon opposite sides of said sheet, whereby said sheet is kept bent into a series of reversed curves.

2. A battery-plate separator comprising a perforated self-supporting flexible sheet of insulating material, and a plurality of bars of insulating material arranged vertically and in staggered relation upon opposite sides of said sheet, whereby said sheet is kept bent into a series of reverse curves.

3. As a new article of manufacture, a separator for battery-plates composed of a sheet of insulating material and a plurality of bars, also composed of insulating material, secured in staggered relation on both sides of the sheet by passing through a series of loops formed integrally with the plate itself.

4. As a new article of manufacture, a separator for battery-plates composed of a perforated sheet of insulating material and a plurality of vertical bars, also composed of insulating material, secured in staggered relation on both sides of the sheet by passing through a series of loops formed integrally with the plate itself.

5. As a new article of manufacture, a separator for battery-plates composed of a perforated sheet of insulating material formed into a series of reversed curves, and a plurality of vertical bars, also composed of insulating material, secured in staggered relation on both sides of the sheet by passing through a series of loops formed integrally with the plate itself, and located opposite the points of highest curvature.

HENRY C. PORTER.

Witnesses:
F. H. DRURY,
O. R. BARNETT.